United States Patent
Wang et al.

(10) Patent No.: US 7,849,238 B2
(45) Date of Patent: Dec. 7, 2010

(54) MULTIPLE-APPARATUS CONNECTION SYSTEM AND THE METHOD THEREOF

(75) Inventors: Tung-Yi Wang, Pan-Chiao (TW); Meng-Feng Lin, Chia-Yi Hsien (TW); Chih-Yuan Hsu, Tai-Nan Hsien (TW); Shih-Kuan Chang, Chang-Hua Hsien (TW)

(73) Assignee: MediaTek Inc., Hsin-Chu (TW)

( * ) Notice: Subject to any disclaimer, the term of this patent is extended or adjusted under 35 U.S.C. 154(b) by 113 days.

(21) Appl. No.: 11/222,896

(22) Filed: Sep. 8, 2005

(65) Prior Publication Data

US 2006/0080476 A1  Apr. 13, 2006

(30) Foreign Application Priority Data

Sep. 10, 2004 (TW) ............................. 93127381 A (51) Int. Cl.
  *G06F 13/12* (2006.01)
  *G06F 13/38* (2006.01)
(52) U.S. Cl. .................................. 710/63; 324/538
(58) Field of Classification Search ............ 710/2, 710/63
  See application file for complete search history.

(56) References Cited

U.S. PATENT DOCUMENTS

| | | | | |
|---|---|---|---|---|
| 6,131,134 A * | 10/2000 | Huang et al. | ................. | 710/302 |
| 6,452,402 B1 * | 9/2002 | Kerai | ......................... | 324/538 |
| 6,509,659 B1 * | 1/2003 | Carroll et al. | ................ | 307/125 |
| 6,658,497 B1 * | 12/2003 | Kawasaki et al. | .............. | 710/8 |
| 6,854,024 B2 * | 2/2005 | Barrenscheen et al. | ........ | 710/19 |
| 7,296,107 B2 * | 11/2007 | Lunsford et al. | ............ | 710/304 |
| 2002/0169915 A1 * | 11/2002 | Wu | ............................ | 710/305 |
| 2003/0236934 A1 * | 12/2003 | Park | ............................ | 710/74 |

OTHER PUBLICATIONS

Andrew S. Tanenbaum, Structued Computer Organization, 1984, Prentice-Hall, Inc., Second edition, pp. 10-11.*

* cited by examiner

*Primary Examiner*—Henry W Tsai
*Assistant Examiner*—Elias Mamo
(74) *Attorney, Agent, or Firm*—The Law Offices of Andrew D. Fortney; Andrew D. Fortney; William K. Nelson (57) ABSTRACT

The present invention is a multiple-apparatus connection system; the multiple-apparatus connection system comprises a USB port, a controller, and a voltage determining device. The USB port connects to a peripheral device. The voltage determining device connects to the USB port to generate a detection voltage signal. The controller receives the detection voltage signal and determines the type of the connected peripheral device according to the detection voltage signal.

16 Claims, 9 Drawing Sheets

MULTIPLE-APPARATUS CONNECTION SYSTEM AND THE METHOD THEREOF

BACKGROUND OF THE INVENTION

1. Field of the Invention

The invention relates to a multiple-apparatus connection system and the connecting method thereof, and more particularly to a multiple-apparatus connection system with a USB port for connecting various types of peripheral devices.

2. Description of the Prior Art

In order to proceed data exchanges with various types of peripheral devices, electronic products have conventionally been installed with a plurality of output/input ports, such as serial port, parallel port, RJ45 port, RJ11 port, USB port, phone jack, speaker jack, and power jack etc.

Since consumers have increasing demands for minimizing the size of electronic devices, electronic produces have been forced to reduce in size, thus reducing the space available for the above mentioned output/input ports. Therefore, some output/input ports have to be integrated, or some output/input ports that are less used have been abandoned.

Taking mobile phones as an example, conventional mobile phones comprise the ports of a speakerphone jack, an UART (Universal Asynchronous Receiver/Transmitters) port, an AC charger port, and a mini-USB port. The speakerphone jack is used for connecting to an outer speakerphone and microphone so as to allow the user to have conversations without holding onto the mobile phone. The UART port is used for connecting to a data wire which matches with RS232 specification. The AC charger port is used for connecting to a discrete AC charger, so that the battery can be charged directly. The mini-USB port is used for connecting to any discrete USB devices which match with the mini-USB specification.

However, as mobile phones keep getting smaller while packed with more functions, mobile phones have no more space for the current various types of ports. Therefore, there is a need for a multiple-apparatus connection system to be developed to allow an output/input port to connect to different peripheral apparatuses, so as to reduce the number of output/input ports, to lower the difficulty in design, to save space, and to lower cost.

SUMMARY OF THE INVENTION

Therefore, an objective of the present invention is to provide a multiple-apparatus connection system; the multiple-apparatus connection system is capable of connecting one of multiple types of peripheral devices using a USB port in order to reduce the number of output/input ports, to save space, and to lower cost.

A multiple-apparatus connection system at least includes a USB port, a controller, and at least one voltage determining device. The USB port, e.g. a mini USB port, is used for connecting a peripheral device. The voltage determining device is connected to the USB port to generate a detection voltage signal. The controller receives the detection voltage signal and determines the type of the connected peripheral device according to the detection voltage signal.

The advantage and spirit of the invention may be understood by the following recitations together with the appended drawings.

DETAILED DESCRIPTION OF THE INVENTION

According to a multiple-apparatus connection system of the present invention, a USB port is used for connecting one of multiple types of peripheral devices.

Figure 1A:
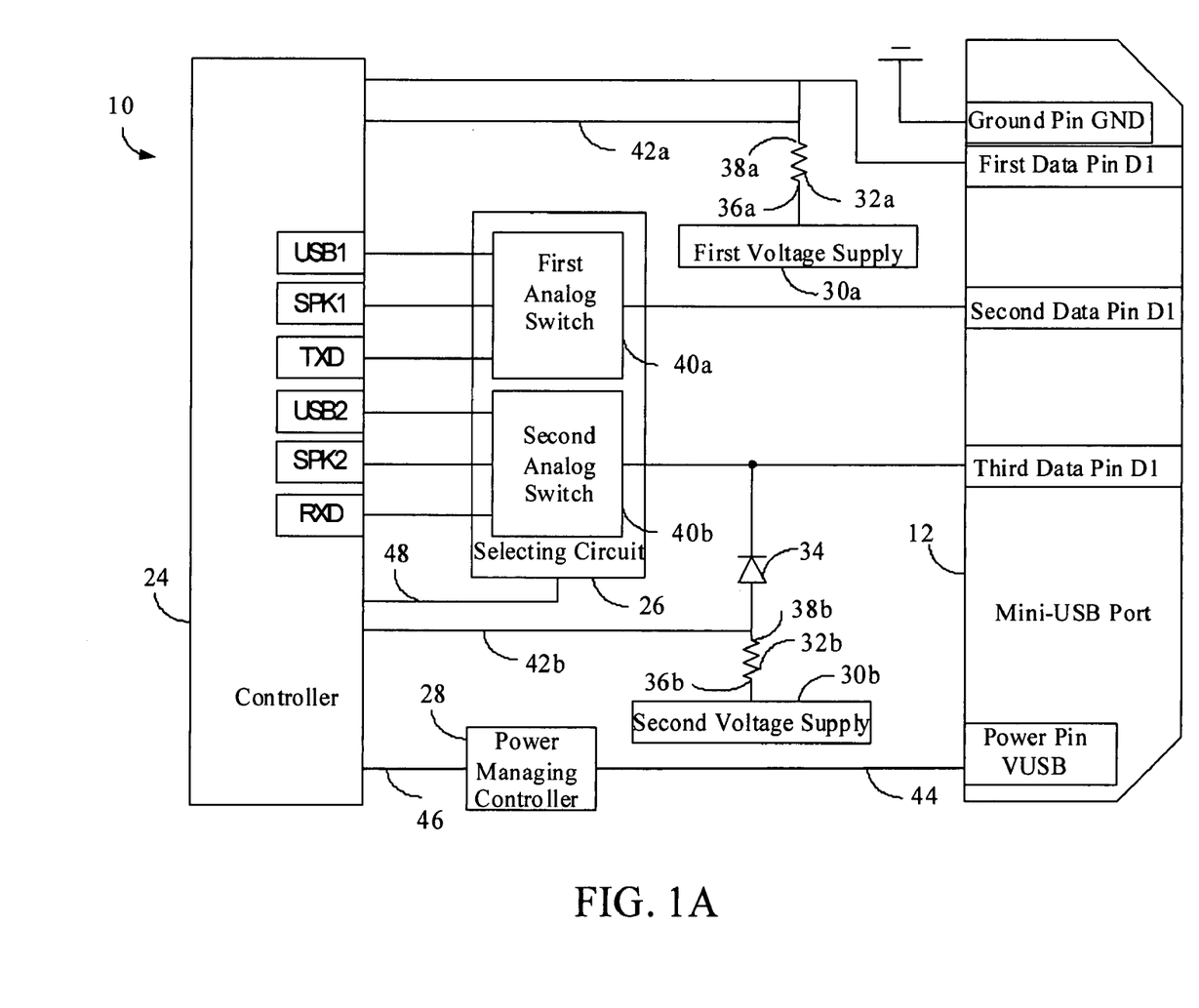
FIG. 1A is a schematic diagram illustrating the first preferred embodiment of the multiple-apparatus connection system of the present invention.

For one example, the preferred embodiment is used with the mini-USB port which is applied in a mobile phone. Referring to FIG. 1A, FIG. 1A is a schematic diagram illustrating a first preferred embodiment of the multiple-apparatus connection system according to the invention. The multiple-apparatus connection system 10 at least includes a mini-USB port 12, at least one voltage determining device, a controller 24, a selecting circuit 26, and a power managing controller 28.

The mini-USB port 12 is used for connecting a peripheral device 14, and the mini-USB port 12 has a ground pin GND, a first data pin D1, a second data pin D2, a third data pin D3, and a power pin VUSB. The first data pin D1 connects to the controller 24, the second data pin D2 and the third data pin D3 respectively connect to the selecting circuit 26, and the power pin VUSB connects to the power managing controller 28.

The voltage determining device has a first voltage supply 30a, a second voltage supply 30b, a first resistor 32a, and a second resistor 32b.

The first voltage supply 30a connects to a first endpoint 36a of the first resistor 32a, and a second endpoint 38a of the first resistor 32a connects to the first data pin D1 of the mini-USB port 12. The voltage at the second endpoint 38a of the first resistor 32a is a first detection voltage signal 42a.

The second voltage supply 30b connects to a first endpoint 36b of the second resistor 32b, and a second endpoint 38b of the second resistor 32b connects to the third data pin D3 of the mini-USB port 12, wherein the voltage of the second endpoint 38b of the second resistor 32b is a second detection voltage signal 42b. Furthermore, a diode 34, which can prevent inverse current, is installed between the second endpoint 38b of the second resistor 32b and the third data pin D3.

The controller 24 receives the first detection voltage signal 42a and the second detection voltage signal 42b; in accordance with the received first detection voltage signal 42a and second detection voltage signal 42b, the controller determines the type of peripheral device 14 that is connected to the mini-USB port and outputs a selecting signal 48 to the selecting circuit 26.

The selecting circuit 26 includes a first analog switch 40a and a second analog switch 40b. The first analog switch 40a can be connected to the second data pin D2 of the mini-USB port 12, and also a first USB pin USB1, a first speaker pin SPK1, and a transmitter pin TXD of the controller 24.

The second analog switch 40b can be connected to the third data pin D3 of the mini-USB port 12, and also a second USB pin USB2, a second speaker pin SPK2, and a receiver pin RXD of the controller 24.

According to the selecting signal 48, the selecting circuit 26 controls the switching of the first analog switch 40a and the second analog switch 40b, so that the second data pin D2 of the mini-USB port 12 can selectively connect with either the first USB pin USB1, the first speaker pin SPK1, or the transmitter pin TXD; it can further allow the third data pin D3 to selectively connect with either the second USB pin USB2, the second speaker pin SPK2, or the receiver pin RXD.

The power managing controller 28 connects to the power pin VUSB, and when the power pin VUSB receives a charging voltage 44, the power pin VUSB generates a charging signal 46 and transmits the charging signal 46 to the controller 24.

The following further describes the multiple-apparatus connection system 10 of the invention when connecting various types of peripheral devices 14 to the mini-USB port 12.

Figure 1B:
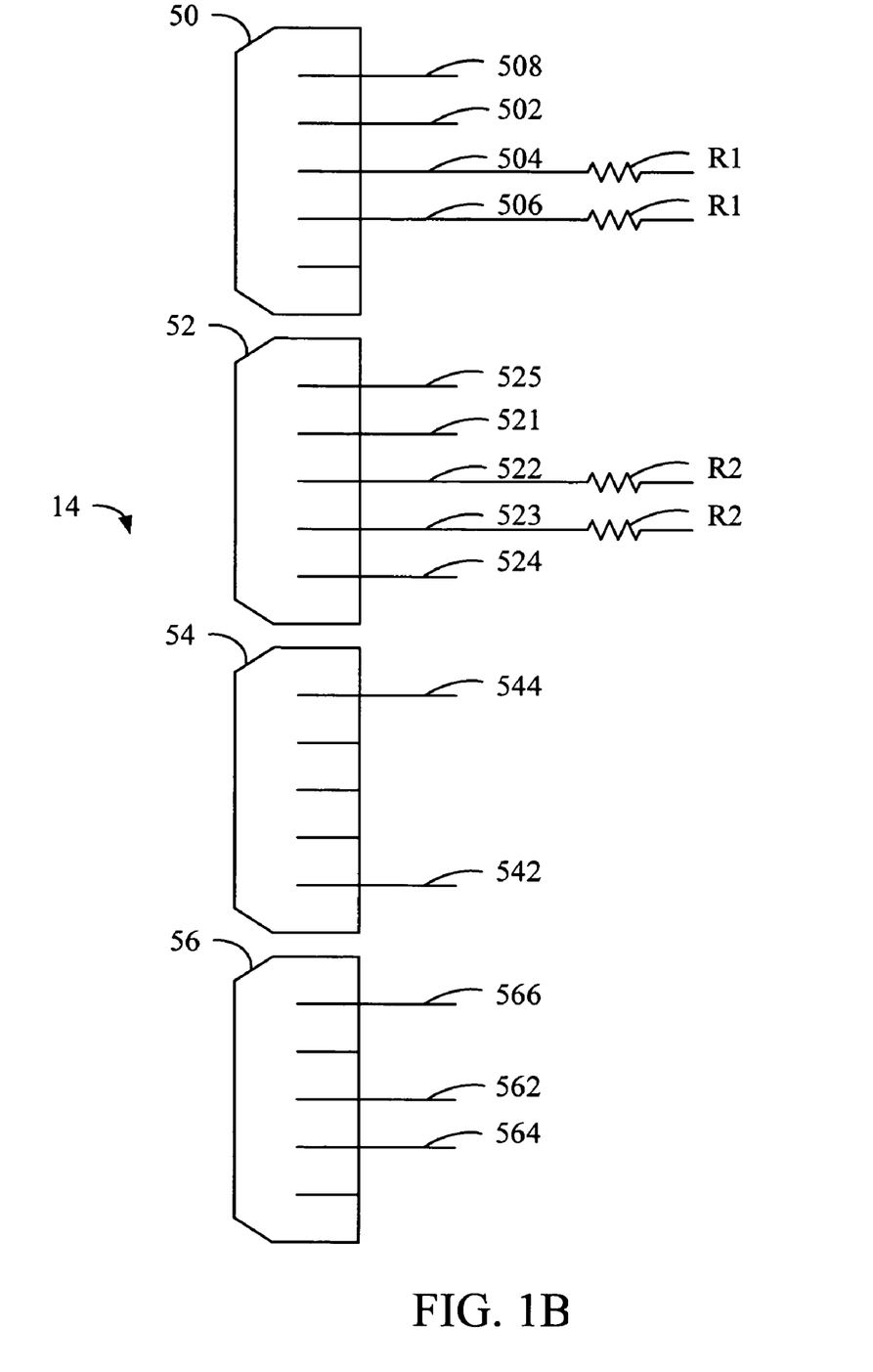
FIG. 1B is a schematic diagram illustrating the peripheral devices that connect to the multiple-apparatus connection system shown in FIG. 1A.

Referring to FIG. 1A and FIG. 1B, FIG. 1B is a schematic diagram illustrating the peripheral devices that connect to the multiple-apparatus connection system shown in FIG. 1A. The multiple-apparatus connection system 10 shown in FIG. 1A uses a mini-USB port 12 to connect to a speakerphone 50, a USB peripheral device 52, an AC charger 54, and a serial port to USB port converting wire 56. The speakerphone 50, USB peripheral device 52, AC charger 54, and serial port to USB port converting wire 56 are not completely shown in FIG. 1B; only the parts that are connected with the mini-USB connector 12 are shown.

In one embodiment of the invention, the first voltage supply 30a provides 1.9V, and the resistance of the first resistor 32a is 2.5 kΩ. The second voltage supply 30b provides 3.3V, and the resistance of the second resistor 32b is 1.5 kΩ.

Speakerphone 50

The speakerphone 50 comprises a microphone wire 502, a first channel wire 504, a second channel wire 506, and a ground wire 508. The microphone wire 502 connects to the first data pin D1 of the mini-USB port 12. The first channel wire 504 is used for conducting a first channel signal (Not shown), and it also connects to the second data pin D2 of the mini-USB port 12. The second channel wire 506 is used for conducting a second channel signal (Not shown), and it also connects to the third data pin D3 of the mini-USB port 12. The ground wire 508 connects to the ground pin GND of the mini-USB port 12. Furthermore, the first channel wire 504 and the second channel wire 506 are respectively connected to a resistor R1 that has a resistance of 16Ω or 32Ω.

When the speakerphone 50 connects with the mini-USB port 12, the second detection voltage signal 42b of the second endpoint 38b of the second resistor 32b is a fourth voltage. In this preferred embodiment, because the resistor R1 is connected with the second resistor 32b, the resulting fourth voltage is below 0.6V; therefore, the controller 24 determines that the peripheral device 14 connected to the mini-USB port 12 is a speakerphone 50 when the controller 24 receives a second detection voltage signal 42b that is below 0.6V.

Moreover, when the speakerphone 50 connects with the mini-USB port 12, the first detection voltage signal 42a of the second endpoint 38a of the first resistor 32a is a second voltage. In the preferred embodiment, because the inner resistor of the speakerphone 50 is connected to the first resistor 32a, the resulting second voltage is between 0.5V and 1.6V; therefore, the controller 24 determines that the peripheral device 14 connected to the mini-USB port 12 is a speakerphone 50 when the controller 24 receives a first detection voltage signal 42a that is between 0.5V and 1.6V.

In other words, by detecting the first detection voltage signal 42a or the second detection voltage signal 42b, the controller 24 is able to determine that the peripheral device 14 connected to the mini-USB port 12 is a speakerphone 50. Furthermore, by detecting the first detection voltage signal 42a or the second detection voltage signal 42b, the controller 24 is able to determine whether the peripheral device 14 connected to the mini-USB port is a legal speakerphone 50.

When the controller 24 determines that the peripheral device 14 connected to the mini-USB port 12 is a speakerphone 50, the controller 24 outputs the selecting signal 48 to the selecting circuit 26, so that the second data pin D2 of the mini-USB port 12 can connect to the first speaker pin SPK1 of the controller 24, and the third data pin D3 of the mini-USB port 12 can connect to the second speaker pin SPK2 of the controller 24.

USB Peripheral Device 52

The USB peripheral device 52 comprises a first wire 521, a second wire 522, a third wire 523, a power supply wire 524, and a ground wire 525. The first wire 521 transmits data in both directions and connects to the first data pin D1 of the mini-USB port 12. The second wire 522 transmits data in both directions and connects to the second data pin D2 of the mini-USB port 12. The third wire 523 transmits data in both directions and connects to the third data pin D3 of the mini-USB port 12. The power supply wire 524 is used as a channel for outputting power or for battery charging, and it also connects to the power pin VUSB of the mini-USB port 12. The ground wire 525 connects to the ground pin GND of the mini-USB port 12. Furthermore, the second wire 522 and the third wire 523 are respectively connected to a resistor R2 with a resistance of 1.5 kΩ.

When the USB peripheral device 52 connects with the mini-USB port 12, the second detection voltage signal 42b of the second endpoint 38b of the second resistor 32b is a fifth voltage. In this preferred embodiment, because the resistor R2 is connected with the second resistor 32b, the resulting fifth voltage is between 0.6V and 1.4V; therefore, the controller 24 will determine that the peripheral device 14 connected to the mini-USB port 12 is a USB peripheral device 52 when the controller 24 receives a second detection voltage signal 42b that is between 0.6V and 1.4V.

Therefore, the controller 24 outputs the selecting signal 48 to the selecting circuit 26, so the second data pin D2 of the mini-USB port 12 can connect with the first USB pin USB1 of the controller 24, and the third data pin D3 of the mini-USB port 12 can connect with the second USB pin USB2 of the controller 24.

Moreover, if the USB peripheral device 52 can provide the function of USB charging, then, when the USB peripheral device 52 connects to the mini-USB port 12, the controller 24 not only can transmit/receive data with the USB peripheral device 52 by the second data pin D2 and the third data pin D3, but also can transmit charging power to the power managing controller 28 to charge the mobile phone by using the power supply wire 524 that is connected with the power pin VUSB.

AC Charger 54

The AC charger 54 comprises a power supply wire 542 and a ground wire 544; the power supply wire 542 connects to the power pin VUSB of the mini-USB port 12, and the ground wire 544 connects to the ground pin GND of the mini-USB port 12.

When the AC charger 54 connects to the mini-USB port 12, the power managing controller 28 receives the charging voltage 44, then generates the charging signal 46, and transmits the charging signal 46 to the controller 24.

Furthermore, the second detection voltage signal 42b of the second endpoint 38b of the second resistor 32b is a first voltage. In this preferred embodiment, the first voltage should be higher than 1.4V. Therefore, when the controller 24 receives the charging signal 46, and the second detection voltage signal 42b is higher than 1.4V, the controller 24 determines that the peripheral device 14 connected to the mini-USB port 12 is an AC charger 54.

(4) Serial Port to USB Port Converting Wire 56

The serial port to USB port converting wire 56 comprises a transmitting wire 562, a receiving wire 564, and a ground wire 566. The transmitting wire 562 is used for transmitting data, and the transmitting wire 562 connects to the second data pin D2 of the mini-USB port 12. The receiving wire 564 is used for receiving data, and the receiving wire 564 connects to the third data pin D3 of the mini-USB port 12. The ground wire 566 connects to the ground pin GND of the mini-USB port 12.

When the serial port to USB port converting wire 56 connects with the mini-USB port 12, the second detection voltage signal 42b of the second endpoint 38b of the second resistor 32b is a first voltage. In this preferred embodiment, the first voltage is higher than 1.4V; therefore, the controller 24 will determine that the peripheral device 14 connected to the mini-USB port 12 is a serial port to USB converting wire 56 when the controller 24 receives a second detection voltage signal 42b that is higher than 1.4V.

Therefore, the controller 24 outputs the selecting signal 48 to the selecting circuit 26, so that the second data pin D2 of the mini-USB port 12 can connect with the transmitting pin TXD of the controller 24, and the third data pin D3 of the mini-USB port 12 can connect with the receiving pin RXD of the controller 24.

Therefore, according to the charging signal 46 generated by the power managing controller 28 and the second detection voltage signal 42b generated by the voltage determining device, the multiple-apparatus connection system 10 of the present invention enables the mini-USB port 12 to connect to a speakerphone 50, a USB peripheral device 52, an AC charger 54, and a serial port to USB port converting wire 56 etc., thus achieving the purpose of reducing the number of output/input ports, lowering the difficulty in design, saving space, and lowering cost.

In general, some mobile phones can directly proceed data transmitting and receiving for the serial port to USB port converting wire 56 right after the mobile phone system is turned on. However, in the process of manufacturing mobile phones, before installing the software of the mobile phone system into the mobile phones, a low order serial port transmission interface is needed to load the mobile phone software or other application software into the mobile phone. Therefore, an UART (Universal Asynchronous Receiver/Transmitters) port is a necessary output/input port in the mobile phones of the prior art.

Through the multiple-apparatus connection system 10 of the present invention, the mini-USB port 12 of the multiple-apparatus connection system 10 can be directly connected to the serial port to USB port converting wire 56. In other words, the above mentioned UART port can be replaced by the multiple-apparatus connection system 10, thus achieving the purpose of reducing the number of output/input ports, lowering the difficulty in design, saving space, and lowering cost.

Moreover, the mini-USB port 12 can be set as a default UART port; this means that the second data pin D2 of the mini-USB port 12 is pre-set to be the transmitter pin TXD connected to the controller 24, and the third data pin D3 of the mini-USB port 12 is pre-set to be the receiver pin RXD connected to the controller 24.

Accordingly, the UART port of the mobile phone can be used to execute the functions of downloading and calibration etc. When the controller 24 determines that the mini-USB port 12 is connected to an AC charger 54, a USB peripheral device 52, or a speakerphone 50, the function of UART will then be turned off, and some other corresponding functions will be activated.

Figure 2:
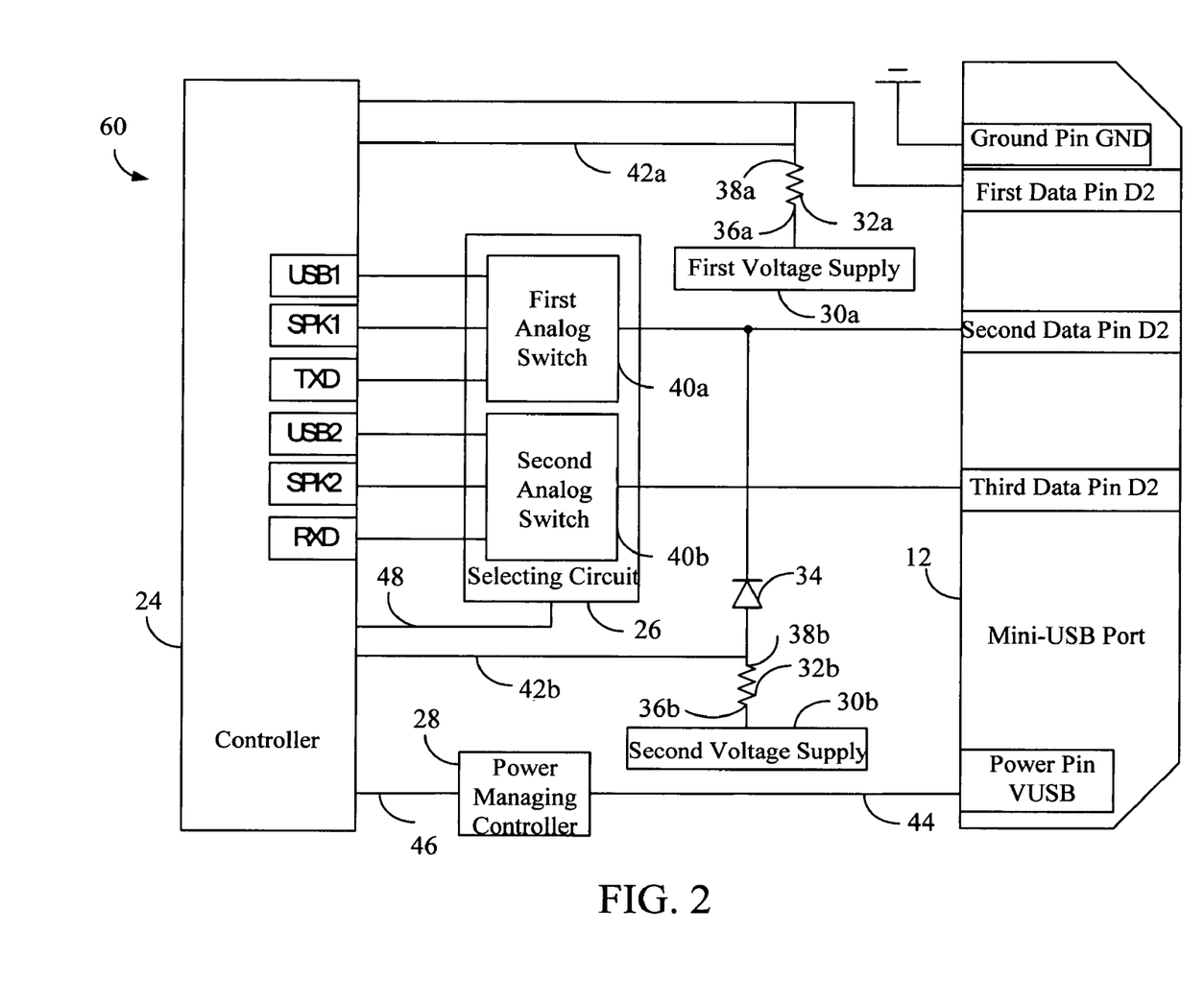
FIG. 2 is a schematic diagram illustrating the second preferred embodiment of the multiple-apparatus connection system of the present invention.

Referring to FIG. 2, FIG. 2 is a schematic diagram illustrating the second preferred embodiment of the multiple-apparatus connection system of the present invention. The difference between the multiple-apparatus connection system 60 shown in FIG. 2 and the multiple-apparatus connection system 10 shown in FIG. 1A is that the second endpoint 38b of the second resistor 32b connects to the second data pin D2 of the mini-USB port 12. Otherwise, the method of connection between the peripheral device 14 and the multiple-apparatus connection system 60 is the same as the method of the multiple-apparatus connection system 10 shown in FIG. 1A.

Therefore, according to the charging signal 46 generated by the power managing controller 28 and the second detection voltage signal 42b generated by the voltage determining device, the present multiple-apparatus connection system 60 enables the mini-USB port 12 to connect to peripheral devices like a speakerphone 50, a USB peripheral device 52, an AC charger 54, and a serial port to USB port converting wire 56 etc., thus achieving the purpose of reducing the number of output/input ports, lowering the difficulty in design, saving space, and lowering cost.

Figure 3:
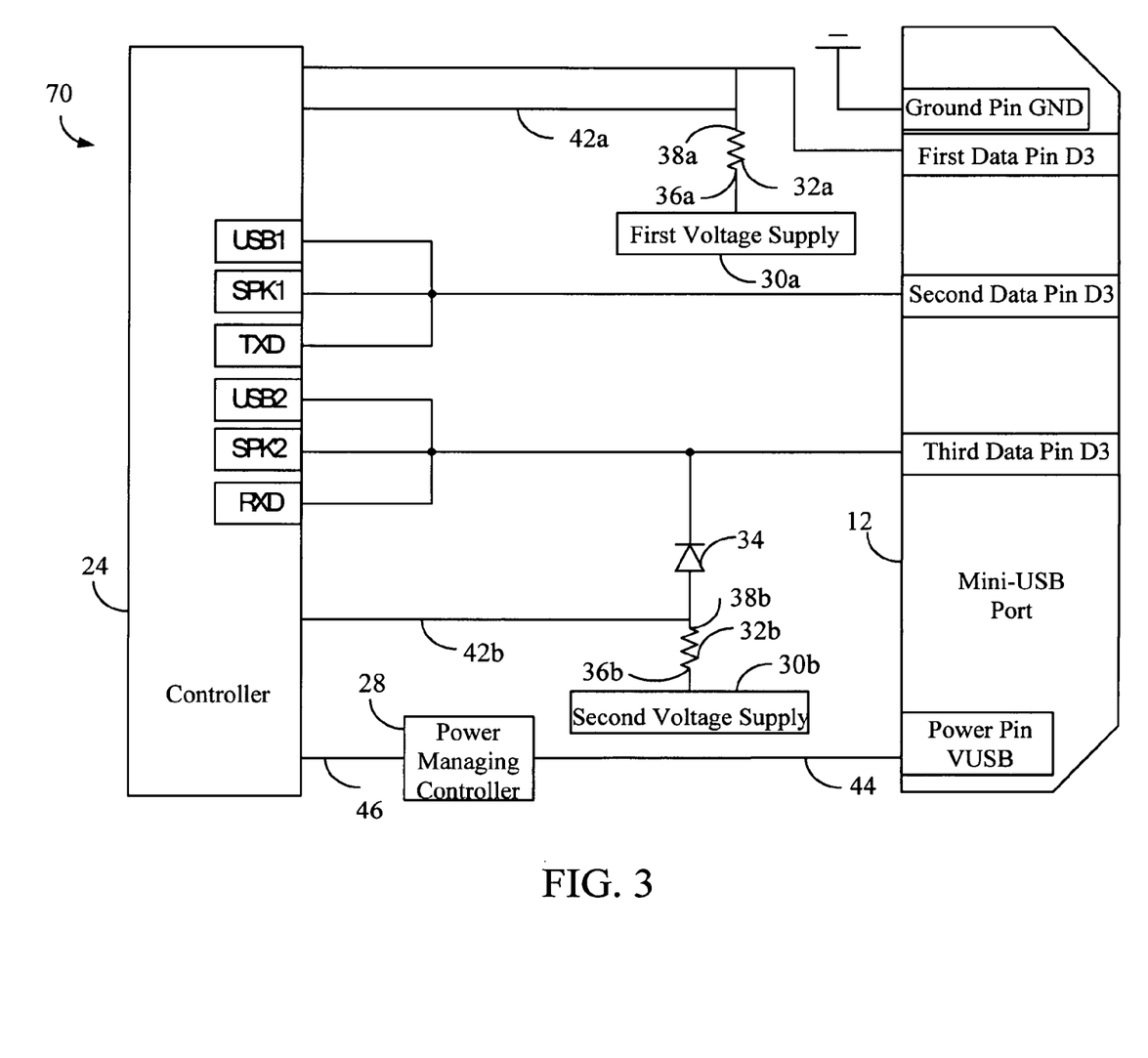
FIG. 3 is a schematic diagram illustrating the third preferred embodiment of the multiple-apparatus connection system of the present invention.

Referring to FIG. 3, FIG. 3 is a schematic diagram illustrating the third preferred embodiment of the multiple-apparatus connection system of the present invention. The difference between the multiple-apparatus connection system 70 shown in FIG. 3 and the multiple-apparatus connection system 10 shown in FIG. 1A is that the multiple-apparatus connection system 70 does not have a selecting circuit 26, and the second data pin D2 is directly connected to the first USB pin USB1, the first speaker pin SPK1, and the transmitter pin TXD; furthermore, the third data pin D3 is directly connected to the second USB pin USB2, the second speaker pin SPK2, and the receiver pin RXD.

When the speakerphone 50 connects to the mini-USB port 12, and when the controller 24 receives a second detection voltage signal 42b which is below 0.6V, the controller 24 determines that the peripheral device 14 connected to the mini-USB port 12 is a speakerphone 50.

Furthermore, the controller 24 will then cutoff the signal transmission of the first USB pin USB1, the second USB pin USB2, the transmitter pin TXD, and the receiver pin RXD. Accordingly, the second data pin D2 of the mini-USB port 12 can connect to the first speaker pin SPK1 of the controller 24, and the third data pin D3 of the mini-USB port 12 can connect to the second speaker pin SPK2 of the controller 24.

When the USB peripheral device 52 connects to the mini-USB port 12, and when the controller 24 receives a second detection voltage signal 42b which is between 0.6V and 1.4V, the controller 24 determines that the peripheral device 14 connected to the mini-USB port 12 is the USB peripheral device 52. Furthermore, the controller 24 will then cut-off the signal transmission of the first speaker pin SPK1, the second speaker pin SPK2, the transmitter pin TXD, and the receiver pin RXD. Accordingly, the second data pin D2 of the mini-USB port 12 can connect to the first USB pin USB1 of the controller 24, and the third data pin D3 of the mini-USB port 12 can connect to the second USB pin USB2 of the controller 24.

When the serial port to USB port converting wire 56 connects to the mini-USB port 12, and when the controller 24 receives a second detection voltage signal 42b which is higher than 1.4V, the controller 24 determines that the peripheral device 14 connected to the mini-USB port 12 is a serial port to USB port converting wire 56. Furthermore, the controller 24 will then cut-off the signal transmission of the first speaker pin SPK1, the second speaker pin SPK2, the first USB pin USB1, and the second USB pin USB2. Accordingly, the second data pin D2 of the mini-USB port 12 can connect to the transmitter pin TXD of the controller 24, and the third data pin D3 of the mini-USB port 12 can connect to the receiver pin RXD of the controller 24.

Therefore, according to the charging signal 46 generated by the power managing controller 28 and the second detection voltage signal 42b generated by the voltage determining device, the present multiple-apparatus connection system 70 enables the mini-USB port 12 to connect to peripheral devices like a speakerphone 50, a USB peripheral device 52, an AC charger 54, and a serial port to USB port converting wire 56 etc., thus achieving the purpose of reducing the number of the output/input ports, lowering the difficulty of the design, saving space, and lowering cost.

Figure 4:
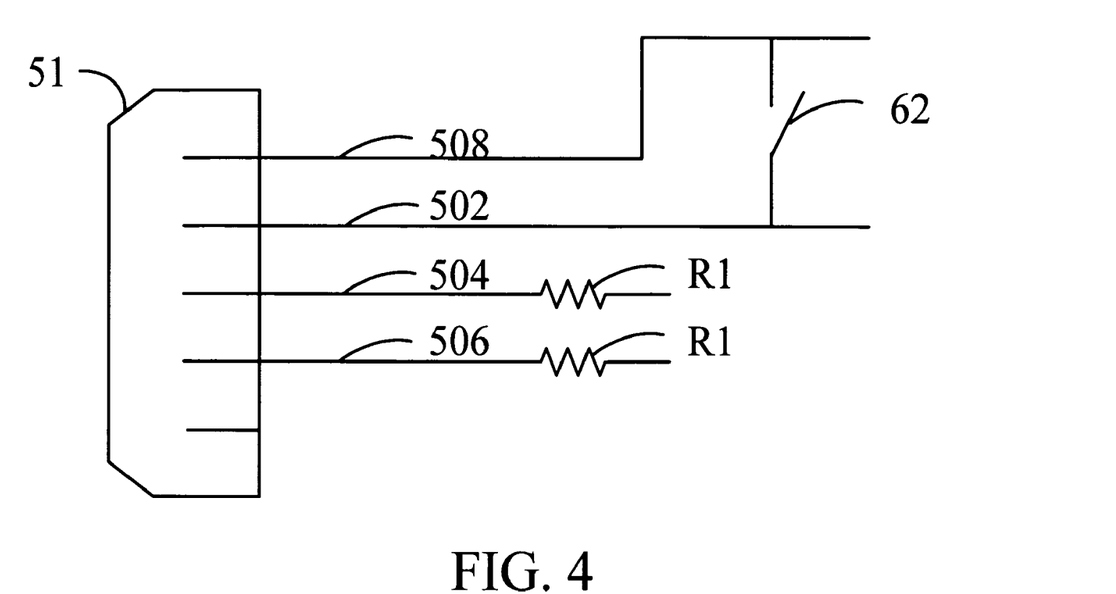
FIG. 4 is a schematic diagram illustrating the speakerphone which adapts to the multiple-apparatus connection system of the present invention.

Referring to FIG. 4, FIG. 4 is a schematic diagram illustrating the speakerphone which adapts to the multiple-apparatus connection system of the present invention. The speakerphone 51 is not completely shown in FIG. 4; only the parts that are connected with the mini-USB port 12 are shown. Comparing with the speakerphone 50 shown in FIG. 1A, the speakerphone 51 shown in FIG. 4 further comprises a switch 62 which connects with a microphone wire 502 and a ground wire 508. When the switch 62 is turned on, the second detection voltage signal 42b of the second endpoint 38b of the second resistor 32b is a third voltage. In this preferred embodiment, because the second endpoint 38b of the second resistor 32b is grounded after the switch 62 is turned on, the third voltage approaches 0V. Therefore, when the controller 24 receives a second detection voltage signal 42b that is nearly 0V, the controller 24 activates a triggering function to trigger a pick up function or a hang up function of the mobile phone. In other words, by detecting the second detection voltage signal 42b, the present invention is able to support the detecting of function keys of the speakerphone 51.

Beside the above mentioned peripheral devices like speakerphone 50, USB peripheral device 52, AC charger 54, and serial port to USB port connecting wire 56, the multiple-apparatus connection system 10 of the present invention can also be connected with a microphone 54, a stereo-speakerphone 66, and a mono-speakerphone 68.

Figure 5:
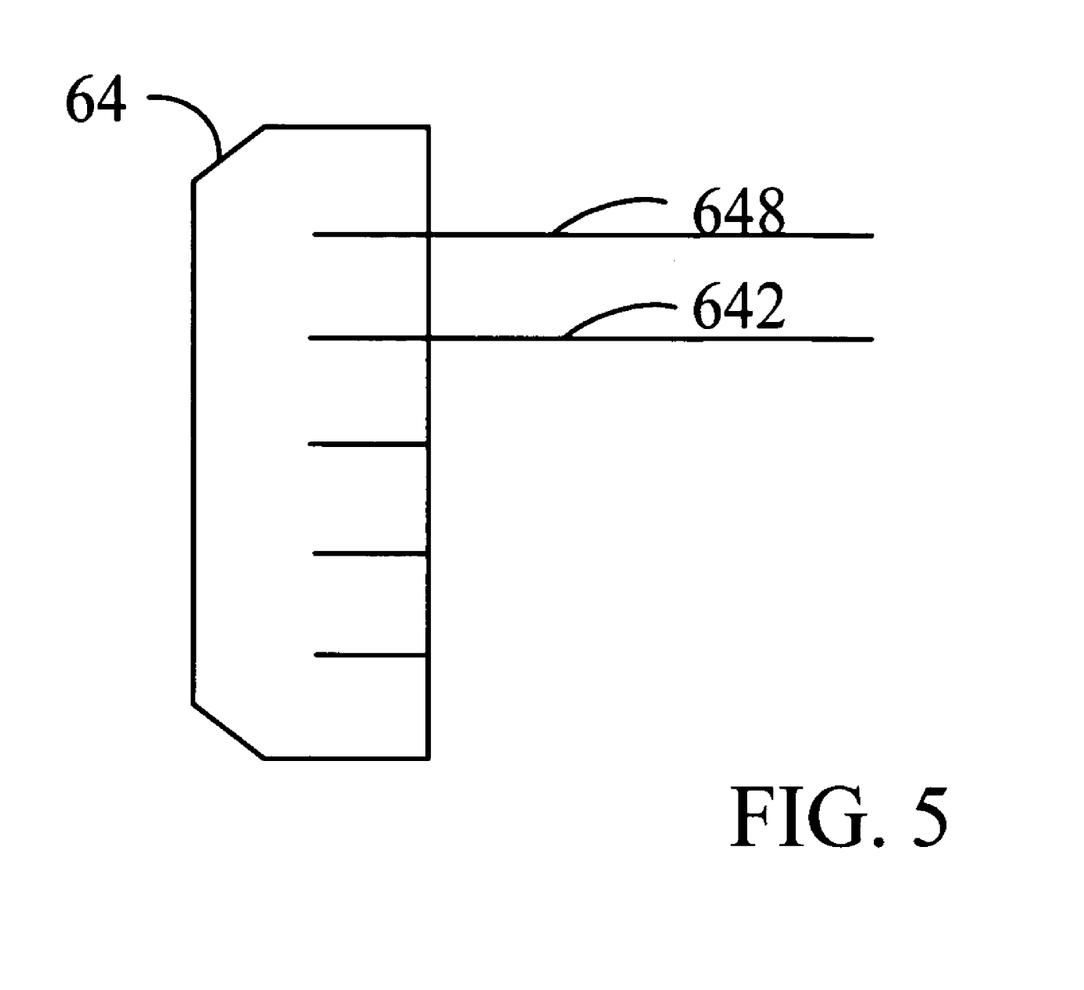
FIG. 5 is a schematic diagram illustrating the microphone of the multiple apparatus connection system of the present invention.

Referring to FIG. 1A and FIG. 5, FIG. 5 is a schematic diagram illustrating the microphone of the multiple apparatus connection system of the present invention. The microphone 64 comprises a microphone wire 642 and a ground wire 648. The microphone wire 642 connects to the first data pin D1 of the mini-USB port 12. The ground wire 648 connects to the ground pin GND of the mini-USB port 12.

When the microphone 64 connects to the mini-USB port 12, the first detection voltage signal 42a of the second endpoint 38a of the first resistor 32a is a second voltage. In this preferred embodiment, because the inner resistor of the microphone 64 is connected with the first resistor 32a, the second voltage is between 0.5V and 1.6V. Accordingly, when the controller 24 receives a first detection voltage signal 42a which is between 0.5V and 1.6V, the controller 24 determines that the peripheral device 14 connected to the mini-USB port 12 is a microphone 64.

Figure 6:
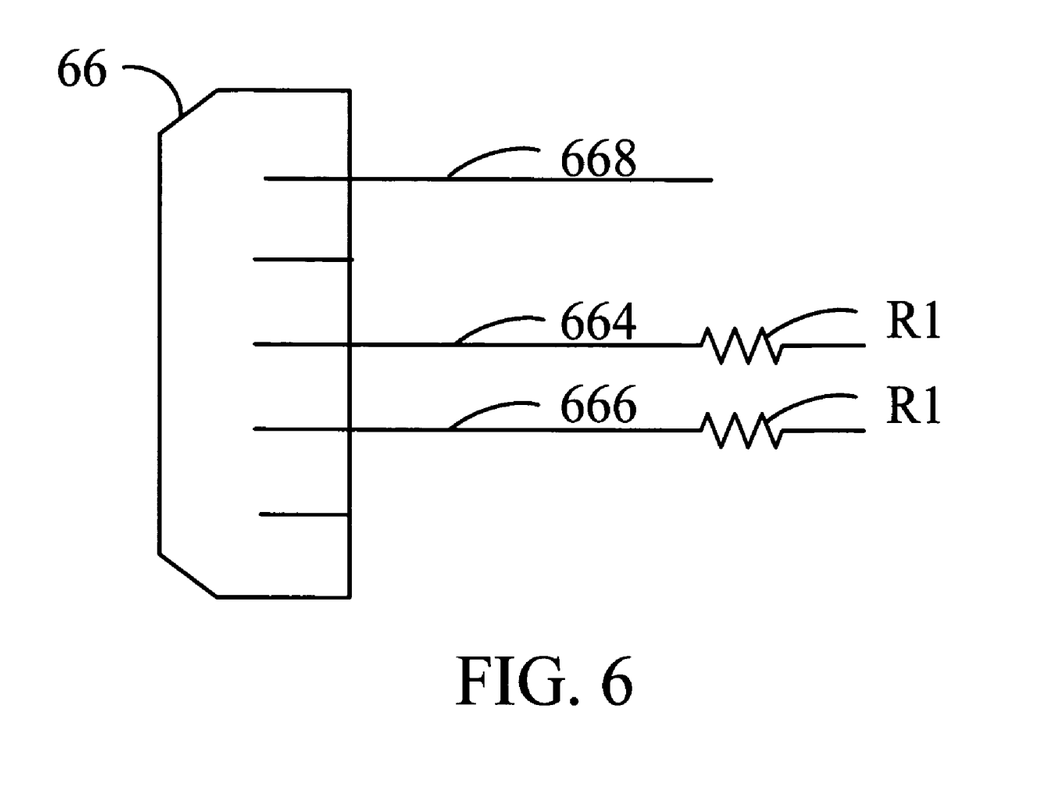
FIG. 6 is a schematic diagram illustrating the stereo-speakerphone connected to the multiple-apparatus connection system of the present invention.

Referring to FIG. 1A and FIG. 6, FIG. 6 is a schematic diagram illustrating the stereo-speakerphone connected to the multiple-apparatus connection system of the present invention. The stereo-speakerphone 66 comprises a first channel wire 664, a second channel wire 666, and a ground wire 668. The first channel wire 664 is used for transmitting the first channel audio/video signal (not shown), and the first channel wire 664 connects to the second data pin D2 of the mini-USB port 12. The second channel wire 666 is used for transmitting the second channel audio/video signal (not shown), and the second channel wire 666 connects to the third data pin D3 of the mini-USB port 12. The ground wire 668 connects to the ground pin GND of the mini-USB port 12. Furthermore, the first channel wire 664 and the second channel wire 666 are respectively connected with a resistor R1, in which the resistance of the resistor R1 is about 16Ω or 32Ω.

When the stereo-speakerphone 66 connects to the mini-USB port 12, the second detection voltage signal 42b of the second endpoint 38b of the second resistor 32b is a fourth voltage. In the preferred embodiment, because the resistor R1 is connected with the second resistor 32b, the fourth voltage is lower than 0.6V. Accordingly, when the controller 24 receives a second detection voltage signal 42b which is lower than 0.6V, the controller 24 determines that the peripheral device 14 connected to the mini-USB port 12 is a stereo-speakerphone 66.

Therefore, the controller 24 outputs the selecting signal 48 to the selecting circuit 26, so that the resulting second data pin D2 of the mini-USB port 12 can connect with the first speaker pin SPK1 of the controller 24; also, the third data pin D3 of the mini-USB port 12 can connect with the second speaker pin SPK2 of the controller 24.

Figure 7:
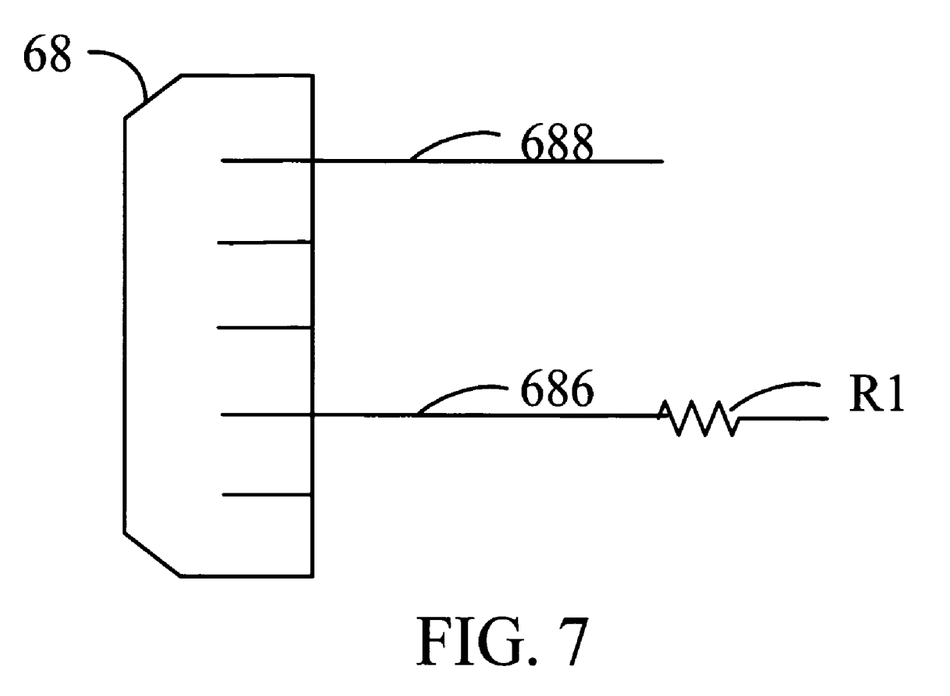
FIG. 7 is a schematic diagram illustrating the mono-speakerphone connected to the multiple-apparatus connection system of the present invention.

Referring to FIG. 1A and FIG. 7, FIG. 7 is a schematic diagram illustrating the mono-speakerphone connected to the multiple-apparatus connection system of the present invention. The mono-speakerphone 68 comprises a second channel wire 686, and a ground wire 688. The second channel wire 686 is used for transmitting the second channel audio/video signal (not shown), and the second channel wire 686 connects to the third data pin D3 of the mini-USB port 12. The ground wire 688 connects to ground pin GND of the mini-USB port 12. Furthermore, the second channel wire 686 connects with a resistor R1 in which the resistance of the resistor R1 is about 16Ω or 32Ω.

When the mono-speakerphone 68 connects to the mini-USB port 12, the second detection voltage signal 42b of the second endpoint 38b of the second resistor 32b is a fourth voltage. In the preferred embodiment, because the resistor R1 is connected with the second resistor 32b, the fourth voltage is lower than 0.6V. Accordingly, when the controller 24 receives a second detection voltage signal 42b which is lower than 0.6V, the controller 24 determines that the peripheral device 14 connected to the mini-USB port 12 is a mono-speakerphone 68.

Therefore, the controller 24 outputs the selecting signal 48 to the selecting circuit 26, so that the resulting third data pin D3 of the mini-USB port 12 can connect with the second speaker pin SPK2 of the controller 24.

Figure 8:
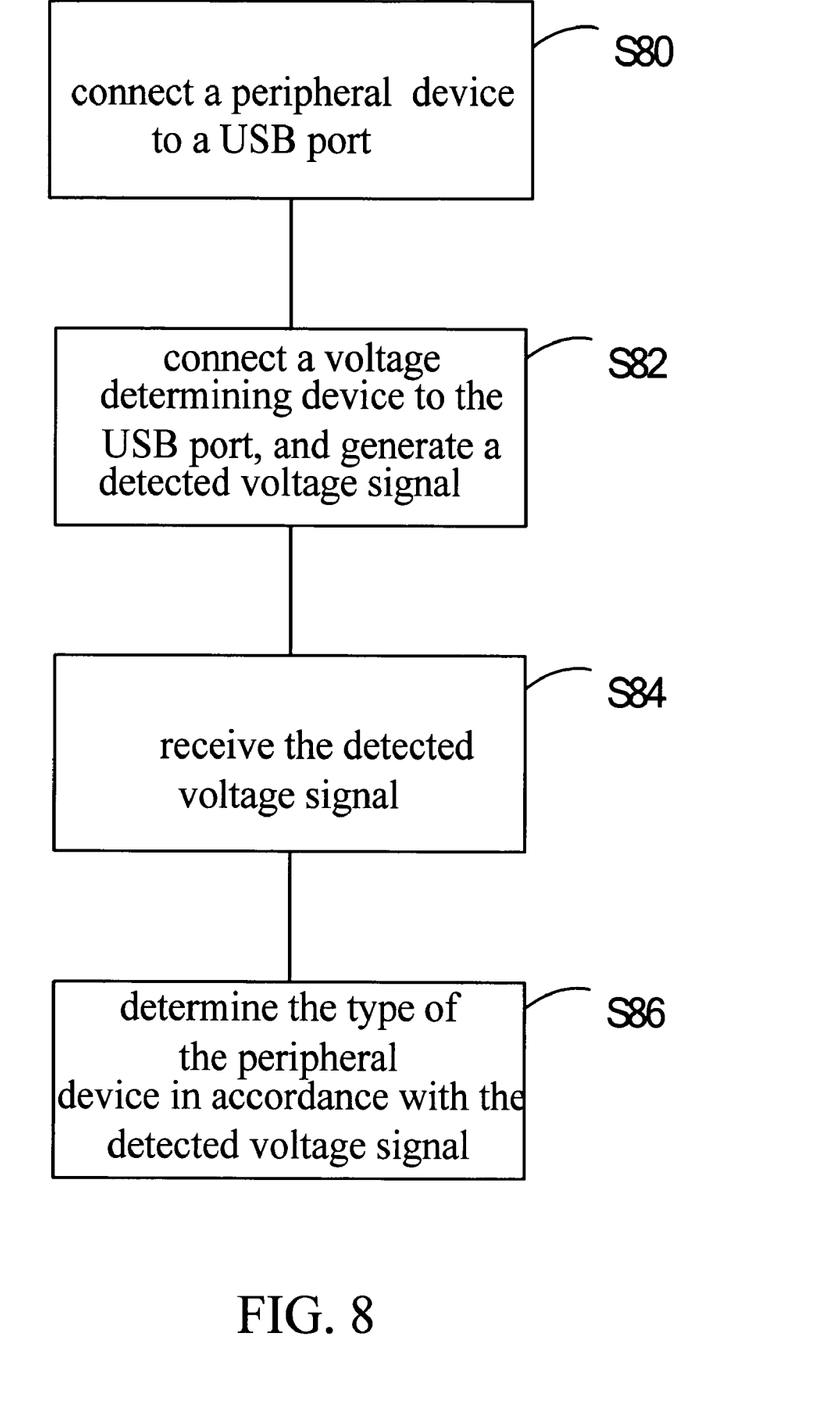
FIG. 8 is a flow chart illustrating the multiple-apparatus connection method of the present invention.

Referring to FIG. 8, FIG. 8 is a flow chart illustrating the multiple-apparatus connection method of the present invention. Taking the multiple-apparatus connection system 10 in FIG. 1A as an example, the multiple-apparatus connection method of the invention comprises the following steps:

S80: Connect a peripheral device to a USB port;
S82: Connect a voltage determining device to the USB port, and generate a detection voltage signal;
S84: Receive the detection voltage signal; and
S86: Determine the type of the peripheral device in accordance with the detection voltage signal.

Therefore, according to the charging signal 46 and the second detection voltage signal 42b, the mini-USB port 12 of the present multiple-apparatus connection system enables the mini-USB port 12 to connect to peripheral devices like a speakerphone 50, a USB peripheral device 52, an AC charger 54, and a serial port to USB port converting wire 56 etc., thus achieving the purpose of reducing the number of output/input ports, lowering the difficulty of designing, saving space, and lowering cost.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A multiple-apparatus connection system comprising:
a mini universal serial bus (USB) port, comprising a first data pin, a second data pin, a third data pin, a ground pin, and a power supply pin, for connecting a peripheral device;
at least one voltage determining device connected to the mini USB port, the at least one voltage determining device generating a detection voltage signal when the peripheral device is connected to the mini USB port, one of the at least one voltage determining devices comprising a voltage supply device and a resistor having a first endpoint connected to the first data pin and a second endpoint connected to the voltage supply device, wherein the at least one voltage determining device provides the detection voltage signal at the first endpoint of the resistor; and
a controller that receives the detection voltage signal at the first endpoint of the resistor and determines a type of the connected peripheral device according to the detection voltage signal.

2. The connection system of claim 1, wherein the peripheral device is an AC charger comprising:
a power supply wire to be connected to the power supply pin of the USB port; and
a ground wire to be connected to the ground pin of the USB port;
wherein the detection voltage signal is a first voltage when the AC charger is connected to the USB port.

3. The connection system of claim 1, wherein the peripheral device is a microphone comprising:
a microphone wire to be connected to the first data pin of the USB port; and
a ground wire to be connected to the ground pin of the USB port;
wherein the detection voltage signal is a second voltage when the microphone is connected to the USB port.

4. The connection system of claim 3, wherein the microphone further comprises a switch connected to the microphone wire and the ground wire, and the detection voltage signal is a third voltage when the switch is turned on.

5. The connection system of claim 1, wherein the peripheral device is a speaker comprising:
a first channel wire to be connected to the first data pin of the USB port; and
a ground wire to be connected to the ground pin of the USB port;
wherein the detection voltage signal is the fourth voltage when the speaker is connected to the USB port.

6. The connection system of claim 5, wherein the speaker further comprises:
a second channel wire to be connected to the second data pin of the USB port.

7. The connection system of the claim 1, wherein the peripheral device is a serial port to USB port converting wire, the converting wire comprising:
a transmitting wire to be connected to the first data pin of the USB port;
a receiving wire to be connected to the second data pin of the USB port, and
a ground wire to be connected to the ground pin of the USB port;
wherein the detection voltage signal is the first voltage when the converting wire is connected to the USB port.

8. The connection system of claim 1, wherein the peripheral device is a USB peripheral device which supports the USB communication protocol, the USB peripheral device comprising:
a first wire to be connected to the first data pin of the USB port;
a second wire to be connected to the second data pin of the USB port;
a third wire to be connected to the third pin data of the USB port;
a power supply wire to be connected to the power supply pin of the USB port; and
a ground wire to be connected to the ground pin of the USB port;
wherein the detection voltage signal is a fifth voltage when the USB peripheral device connects to the USB port.

9. A multiple-apparatus connection method comprising the steps of:
connecting a peripheral device to a mini universal serial bus (USB) port comprising a first data pin, a second data pin, a third data pin, a ground pin, and a power supply pin;
generating a detection voltage signal at a first endpoint of a resistor in a voltage determining device comprising a voltage supply device and the resistor when the peripheral device is connected to the mini USB port, the first endpoint of the resistor being connected to the first data pin and a second endpoint of the resistor being connected to the voltage supply device;
receiving the detection voltage signal at the first endpoint of the resistor; and
determining a type of the peripheral device according to the detection voltage signal.

10. The connection method of claim 9, wherein the peripheral device is an AC charger comprising:

a power supply wire to be connected to the power supply pin of the USB port; and a ground wire to be connected to the ground pin of the USB port;

wherein the detection voltage signal is a first voltage when the AC charger connects to the USB port.

11. The connection method of claim 9, wherein the peripheral device is a microphone comprising:

a microphone wire to be connected to the first data pin of the USB port; and a ground wire to be connected to the ground pin of the USB port;

wherein the detection voltage signal is a second voltage when the microphone connects to the USB port.

12. The connection method of claim 11, wherein the microphone further comprises a switch connecting to the microphone wire and the ground wire, and the detection voltage signal is a third voltage when the switch is turned on.

13. The connection method of claim 9, wherein the peripheral device is a speaker comprising:

a first channel wire to be connected to the first data pin of the USB port; and a ground wire to be connected to the ground pin of the USB port;

wherein the detection voltage signal is the fourth voltage when the speaker is connected to the USB port.

14. The connection method of claim 13, wherein the speaker further comprises:

a second channel wire to be connected to the second data pin of the USB port.

15. The connection method of claim 9, wherein the peripheral device is a serial port to USB port converting wire, the converting wire comprising:

a transmitting wire to be connected to the first data pin of the USB port;

a receiving port to be connected to the second data pin of the USB port; and a ground wire to be connected to the ground pin of the USB port;

wherein the detection voltage signal is the first voltage when the converting wire is connected to the USB port.

16. The connection method of claim 9, wherein the peripheral device is a USB peripheral device which supports the USB communication protocol, the USB peripheral device comprising:

a first wire to be connected to the first data pin of the USB port;

a second wire to be connected to the second data pin of the USB port;

a third wire to be connected to the third data pin of the USB port;

a power supply wire to be connected to the power supply pin of the USB port; and a ground wire to be connected to the ground pin of the USB port;

wherein the detection voltage signal is a fifth voltage when the USB peripheral device is connected to the USB port.

* * * * *